United States Patent
Zhu et al.

(10) Patent No.: US 8,116,716 B2
(45) Date of Patent: Feb. 14, 2012

(54) MOBILE WIRELESS COMMUNICATIONS DEVICE HAVING BUFFERED CLOCK DISTRIBUTION NETWORK FOR MICROPROCESSOR AND RF CIRCUITS

(75) Inventors: Lizhong Zhu, Waterloo (CA); Robert Grant, Listowel (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/942,277

(22) Filed: Nov. 9, 2010

(65) Prior Publication Data

US 2011/0053663 A1 Mar. 3, 2011

Related U.S. Application Data

(63) Continuation of application No. 11/289,901, filed on Nov. 30, 2005, now Pat. No. 7,885,630.

(51) Int. Cl.
*H04B 1/10* (2006.01)
*H04B 7/00* (2006.01)

(52) U.S. Cl. ........ 455/310; 455/311; 455/317; 455/283; 455/296; 455/255; 455/259; 455/265; 455/114.1

(58) Field of Classification Search .................. 455/310, 455/311, 317, 283, 296, 255, 259, 265, 114
See application file for complete search history.

(56) References Cited

U.S. PATENT DOCUMENTS

| | | | |
|---|---|---|---|
| 5,157,356 A | 10/1992 | Wedge | 331/60 |
| 5,513,389 A | 4/1996 | Reeser et al. | 455/311 |
| 5,572,718 A | 11/1996 | Scriber et al. | 395/555 |
| 6,125,268 A | 9/2000 | Boesch et al. | 455/168.1 |
| 6,484,038 B1 | 11/2002 | Gore et al. | 455/552 |
| 6,550,045 B1 | 4/2003 | Lu et al. | 716/6 |
| 6,816,203 B2 | 11/2004 | White | 348/607 |
| 6,865,381 B2 | 3/2005 | Vorenkamp et al. | 455/307 |
| 7,349,679 B1 | 3/2008 | Rudell et al. | 455/209 |
| 2003/0131270 A1 | 7/2003 | Abernathy et al. | 713/322 |
| 2004/0044918 A1 | 3/2004 | Dermott et al. | 713/400 |
| 2004/0260960 A1 | 12/2004 | Hilgendorf et al. | 713/320 |
| 2005/0251699 A1 | 11/2005 | Jacobson | 713/400 |
| 2006/0223482 A1 | 10/2006 | Behzad et al. | 455/323 |

FOREIGN PATENT DOCUMENTS

| | | |
|---|---|---|
| EP | 0903660 | 3/1999 |
| EP | 1003289 | 5/2000 |

*Primary Examiner* — Wen Huang
(74) *Attorney, Agent, or Firm* — Allen, Dyer, Doppelt, Milbrath & Gilchrist, P.A.

(57) ABSTRACT

A mobile wireless communications device includes a circuit board carried by a housing. A microprocessor, RF transceiver and circuitry are carried by the circuit board and operative with each other. Clock buffer circuitry is carried by the circuit board and connected to the RF transceiver and circuitry and microprocessor for isolating a clock signal from the noise of the microprocessor and allowing greater isolation for the RF transceiver from RF circuitry.

11 Claims, 8 Drawing Sheets

MOBILE WIRELESS COMMUNICATIONS DEVICE HAVING BUFFERED CLOCK DISTRIBUTION NETWORK FOR MICROPROCESSOR AND RF CIRCUITS

This application is a continuation of Ser. No. 11/289,901 filed Nov. 30, 2005, now U.S. Pat. No. 7,885,630 issued Feb. 8, 2011, the disclosure of which is hereby incorporated by reference in its entirety.

FIELD OF THE INVENTION

The present invention relates to the field of communications device, and more particularly, this invention relates to mobile wireless communications devices and related methods.

BACKGROUND OF THE INVENTION

Mobile wireless communications devices, such as cellular telephones and similar communications devices, include a housing and circuit board carried by the housing. A microprocessor, radio frequency (RF) transceiver and RF circuitry can be carried by the circuit board and operative with each other. An antenna could be located external or within the housing. A clock, such as a crystal oscillator, could be positioned external to the components and off the circuit board or mounted on the circuit board, and provide a clocking signal to the microprocessor, RF transceiver and other RF circuitry, including any Bluetooth modules, phase locked loop circuits, and local oscillator (LO) circuits. Typically, spurious signals and jitters caused by digital noise from a microprocessor creates problems because it shares the same clock with the RF circuits, such as the reference clock input to the phase locked loop. The clock from the crystal oscillator provides the reference clock input signal to both the RF circuits, such as the phased locked loop circuit, RF circuits and digital circuits, such as the microprocessor, but without buffering.

The microprocessor generates many digital noises that find their way back from the clock reference input of the microprocessor to the reference clock lines with which the RF circuits are sharing. These digital noises are conductively coupled to the RF circuits, including any RF transceiver, Bluetooth module and other RF circuits, such as a local oscillator and phase locked loop circuits, to cause spurious signals and jitters in the circuits, which in turn, degrade the RF performance or cause a radio to fail certain specifications.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
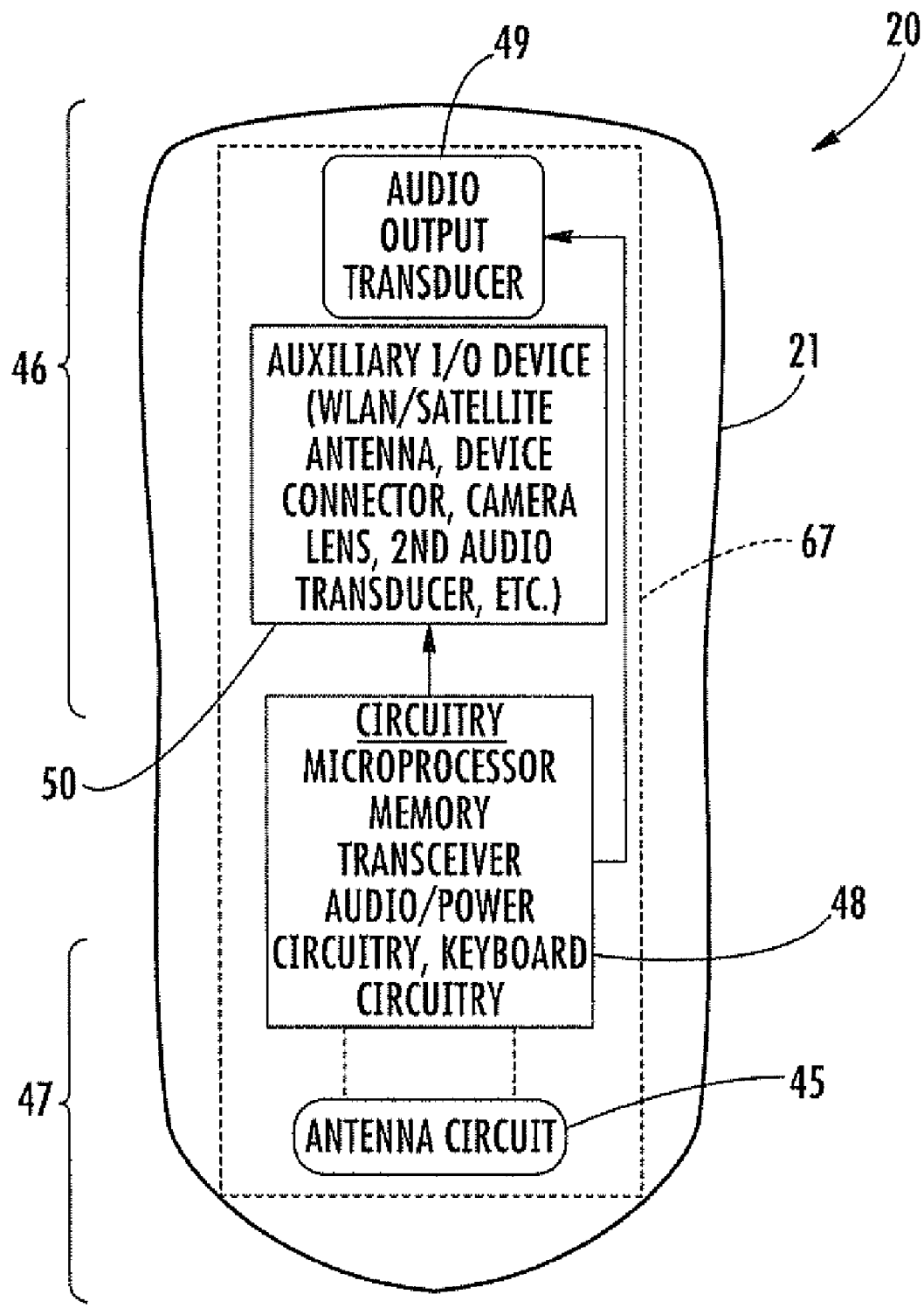
FIG. 1 is a schematic block diagram of an example of a mobile wireless communications device figured as a handheld device and illustrating basic internal components thereof such as can be used in one non-limiting embodiment.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

A mobile wireless communications device includes a housing and a circuit board carried by the housing. A microprocessor, a radio frequency (RF) transceiver and RF circuitry are carried by the circuit board and operative with each other. Clock buffer circuitry is carried by the circuit board and connected to the RF transceiver, RF circuitry and microprocessor for isolating a clock signal from the noise of the microprocessor and allowing greater isolation for the RF transceiver from RF circuitry.

In accordance with one non-limiting embodiment, the RF circuitry includes a Bluetooth module and the clock buffer circuitry is connected to the Bluetooth module for isolating a clock signal after the RF transceiver. The RF circuitry could also include a phase locked loop circuit and the clock buffer circuitry is connected to the phase locked looped circuit for isolating a clock signal after the RF transceiver and Bluetooth module.

In yet another non-limiting example, the RF transceiver is formed as a GSM/GPRS (Global System for Mobile communications/General Packet Radio Service) system. The clock buffer circuitry could be formed as a plurality of serially connected buffers each having an output connected to a predetermined one of the RF circuitry and microprocessor. Each buffer could provide about 40 to about 80 decibels of reversed isolation from its output to its input in a non-limiting example. The plurality of serially connected buffers could also be formed as transistors connected as emitter followers. The housing can be configured for handheld operation and the RF transceiver, RF circuitry and microprocessor can be operative as a cellular communications device. An antenna could be carried by the housing and operative with the RF transceiver.

In various embodiments, the clock buffer circuitry is formed as a cascaded clock buffer circuit and reduces digital noise as spurious jitters from a microprocessor that shares the same clock with various RF circuits, such as a reference clock input to phased locked loops. A clock signal can be generated from a crystal oscillator and provide a reference clock input signal to RF circuits, such as a phased locked loop and other digital circuits, for example, the microprocessor. Because the microprocessor generates digital noises that pass from the clock reference input of the microprocessor to the reference clock lines with which the RF circuits are sharing, these digital noises can be conductively coupled to the RF circuits and cause spurious signals and jitters in the local oscillator circuits, which degrade the RF performance and cause the radio to fail certain specifications.

Different embodiments show that different clock signals can be isolated from the noise of the microprocessor. More sensitive RF circuits, for example, the GSM/GPRS chip set, could be connected to the crystal oscillator output first with proper impedance matching. The output of a first buffer circuit could be connected to a less sensitive RF circuit, for example, a Bluetooth module or chip. The buffer circuit could provide about 40 to about 80 decibel reversed isolation from its output to the input. Other buffer circuits could be included with separate isolation.

Figure 2:
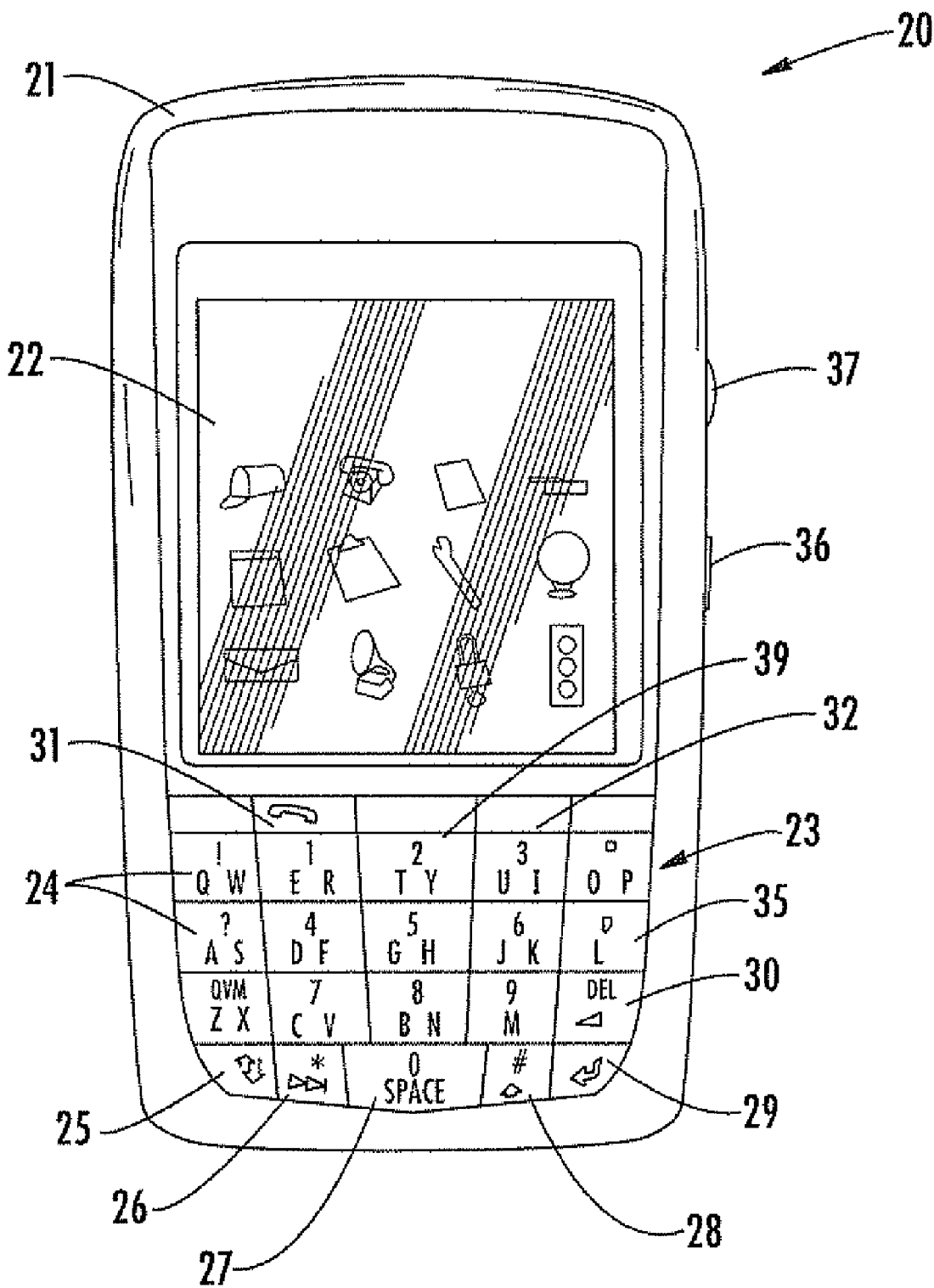
FIG. 2 is a front elevation view of the mobile wireless communications device of FIG. 1.
Figure 3:
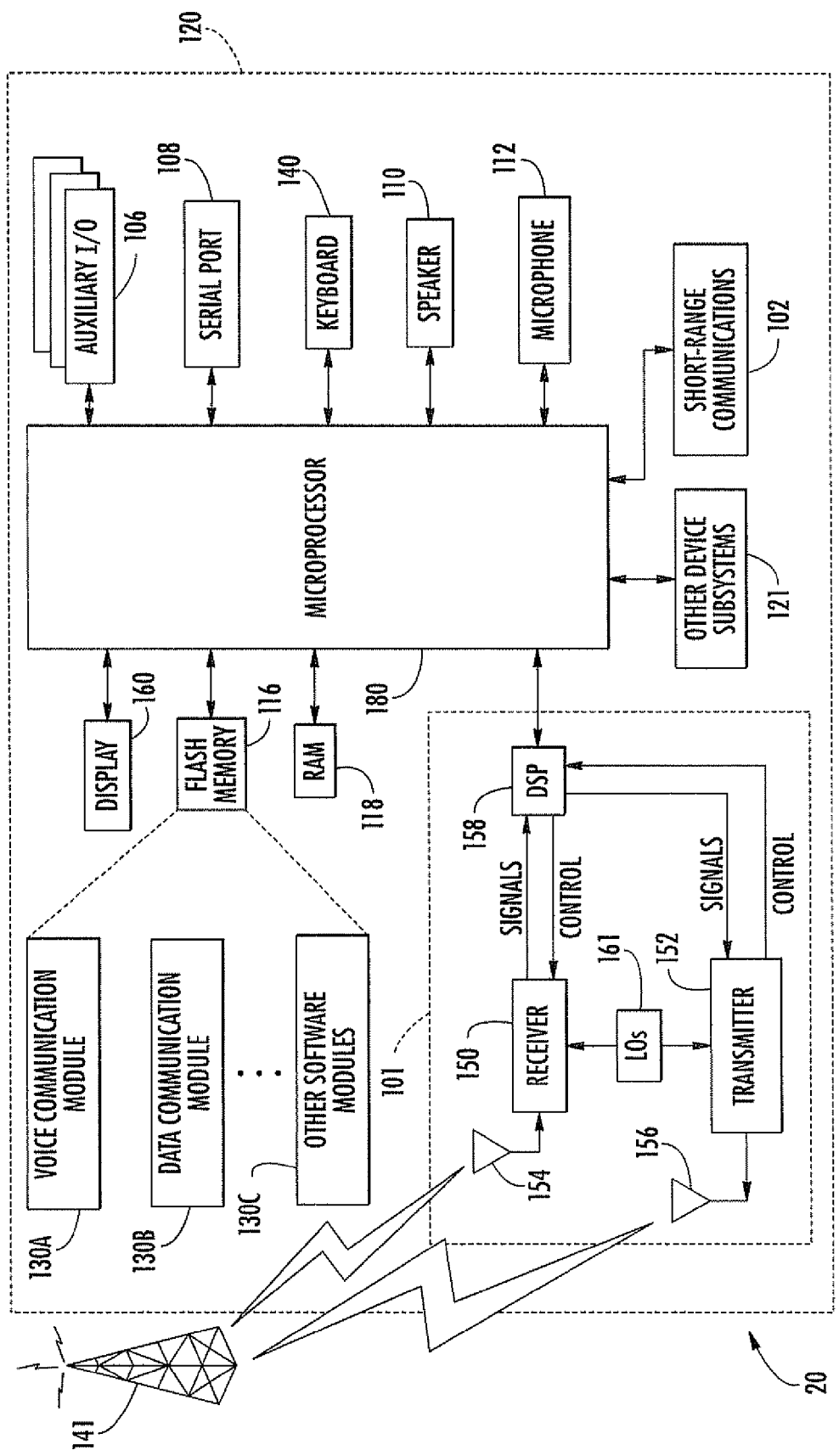
FIG. 3 is a schematic block diagram showing basic functional circuit components that can be used in the mobile wireless communications device of FIGS. 1 and 2.

A brief description will now proceed relative to FIGS. 1-3, which disclose an example of a mobile wireless communications device, for example, a handheld portable cellular radio, which can incorporate the non-limiting examples of the various buffering circuits and clock distribution network. FIGS. 1-3 are representative non-limiting examples of the many different types of functional circuit components and their interconnection, and operative for use with the clock distribution network and buffering circuits as described.

Referring initially to FIGS. 1 and 2, an example of a mobile wireless communications device 20, such as a handheld portable cellular radio, which can be used with the present invention is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 21 for supplying power to the circuitry 48. The term RF circuitry could encompass the interoperable RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 is preferably positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key

26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used. A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 4:
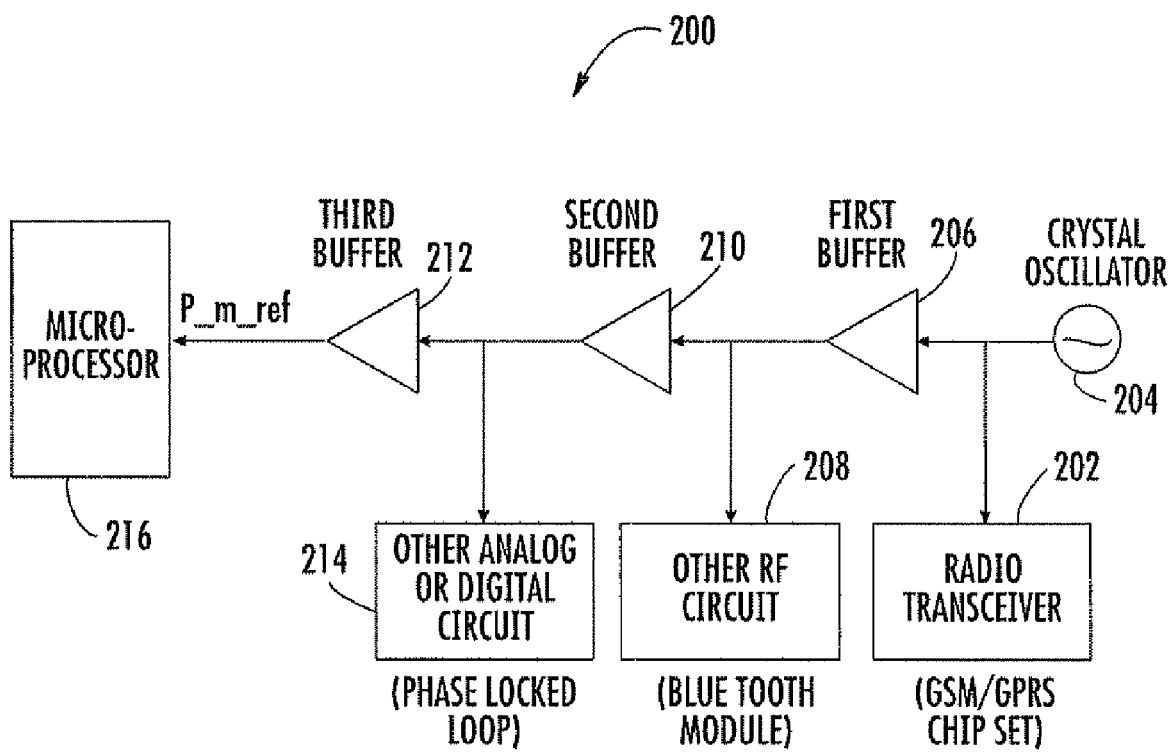
FIG. 4 is a schematic block diagram showing basic components of a radio transceiver and other RF circuits such as a Bluetooth module, and phase locked loop circuit operative with the microprocessor and showing the clock buffer circuitry.

FIG. 4 shows a clock buffering circuit 200, in accordance with one non-limiting embodiment, where the most sensitive RF circuits, for example, a radio transceiver 202 such as a GSM/GPRS chip set are connected first to a clock 204 such as a crystal oscillator output with proper impedance matching. A first buffer circuit 206 has an input connected to the clock or oscillator output. The output of the first buffer circuit 206 is connected to a less sensitive RF circuit 208, for example, a Bluetooth chip. This buffer circuit 206 typically could provide about 40 to about 80 decibel (dB) reverse isolation from its output to the input. Therefore, any analog or digital noise is significantly reduced, which might come from either the Bluetooth chip or a second buffer circuit 210. The second buffer circuit 210 is also connected to the output of the first buffer circuit 206 and to a third buffer circuit 212 and provides another 40 to about 80 decibel reverse isolation from its output. The output of the second buffer circuit 210 could be connected to another analog or digital circuit 214, for example, a phase locked loop circuit. The output of the third buffer circuit 212 is connected to the reference clock input of the digital microprocessor 216. By this arrangement, the high level digital noise at the reference clock input of the microprocessor 216 will be reduced by at least about 80 decibels and will have a minimum to no impact to the RF performance.

Figure 5A:
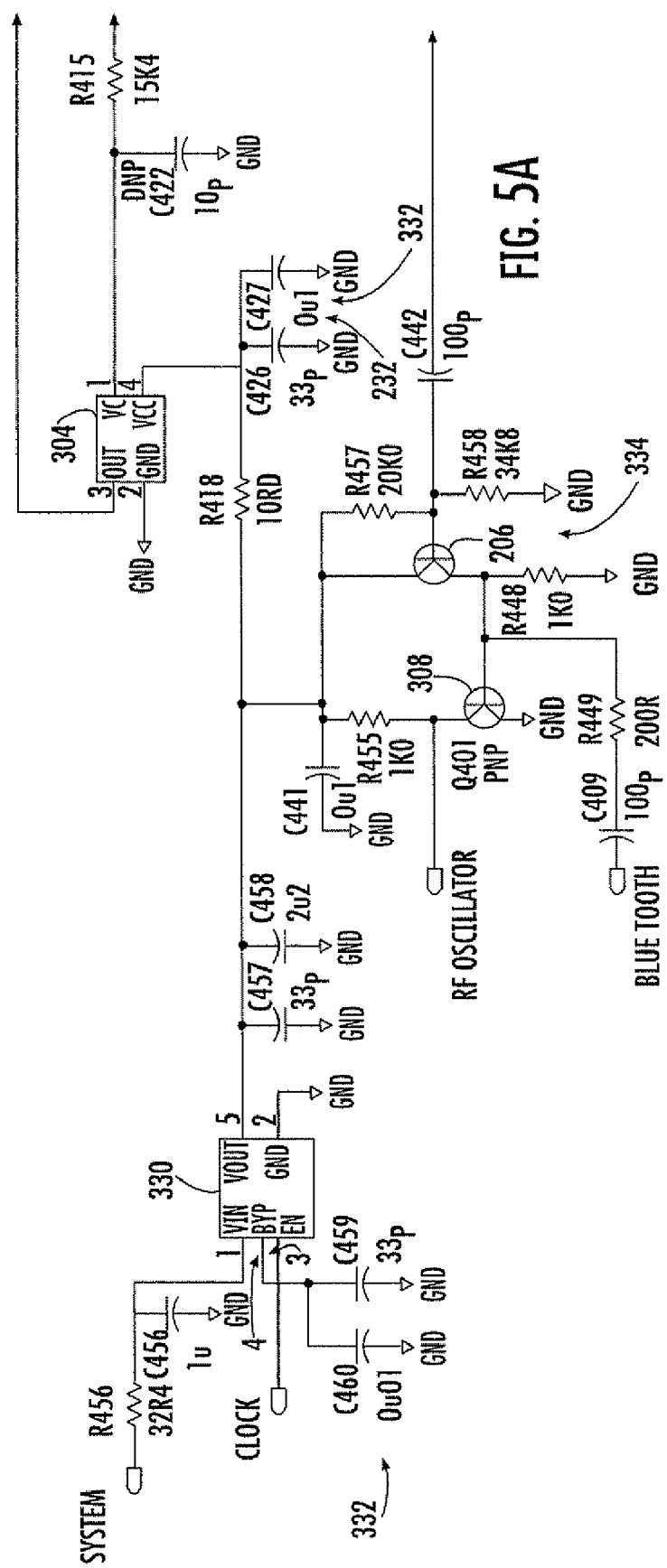
FIGS. 5A-5C are interrelated schematic circuit diagrams showing a microprocessor (FIG. 5B) connected to clock buffer circuitry, such as shown in FIG. 5C.
Figure 5B:
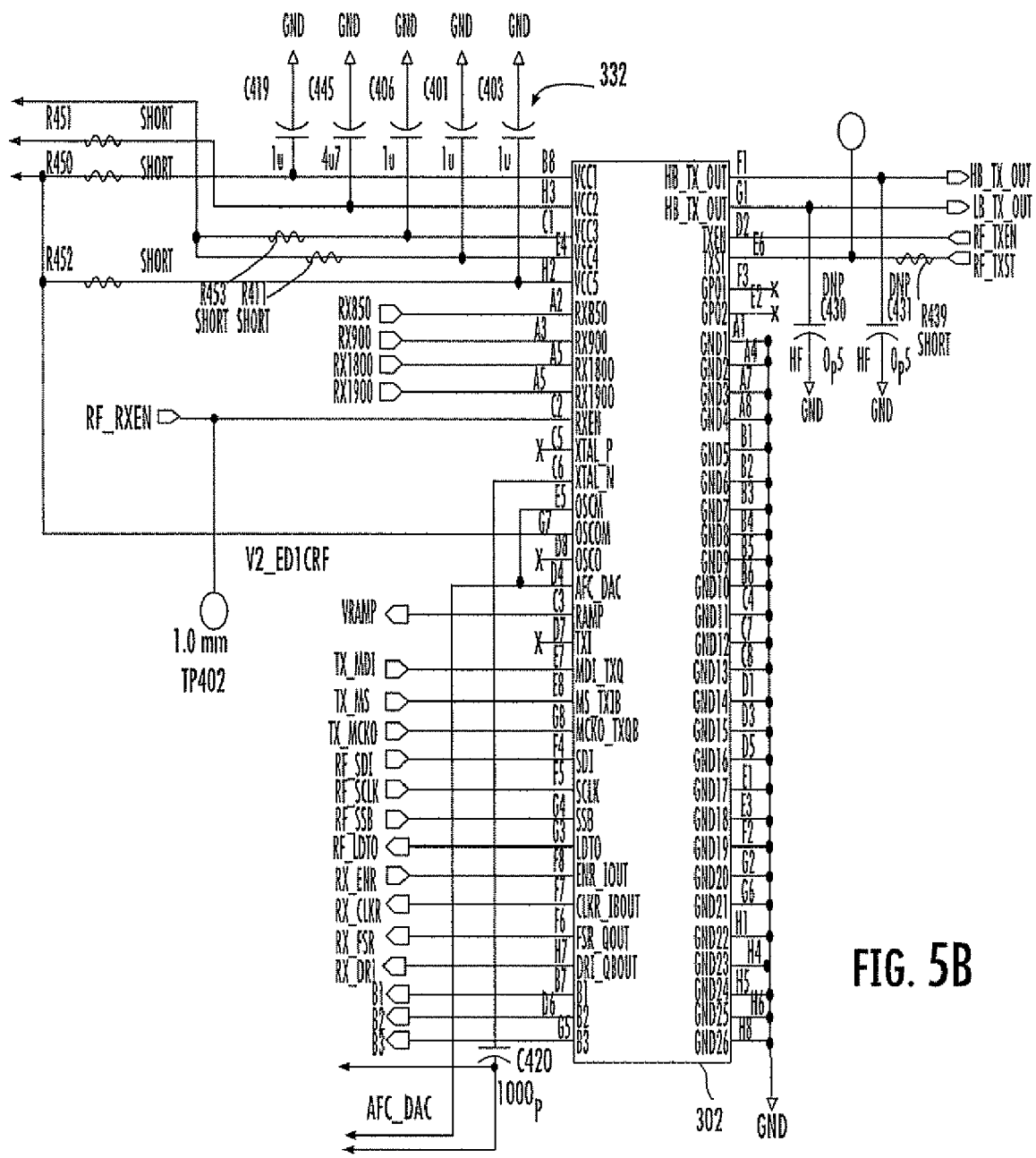
Figure 5C:
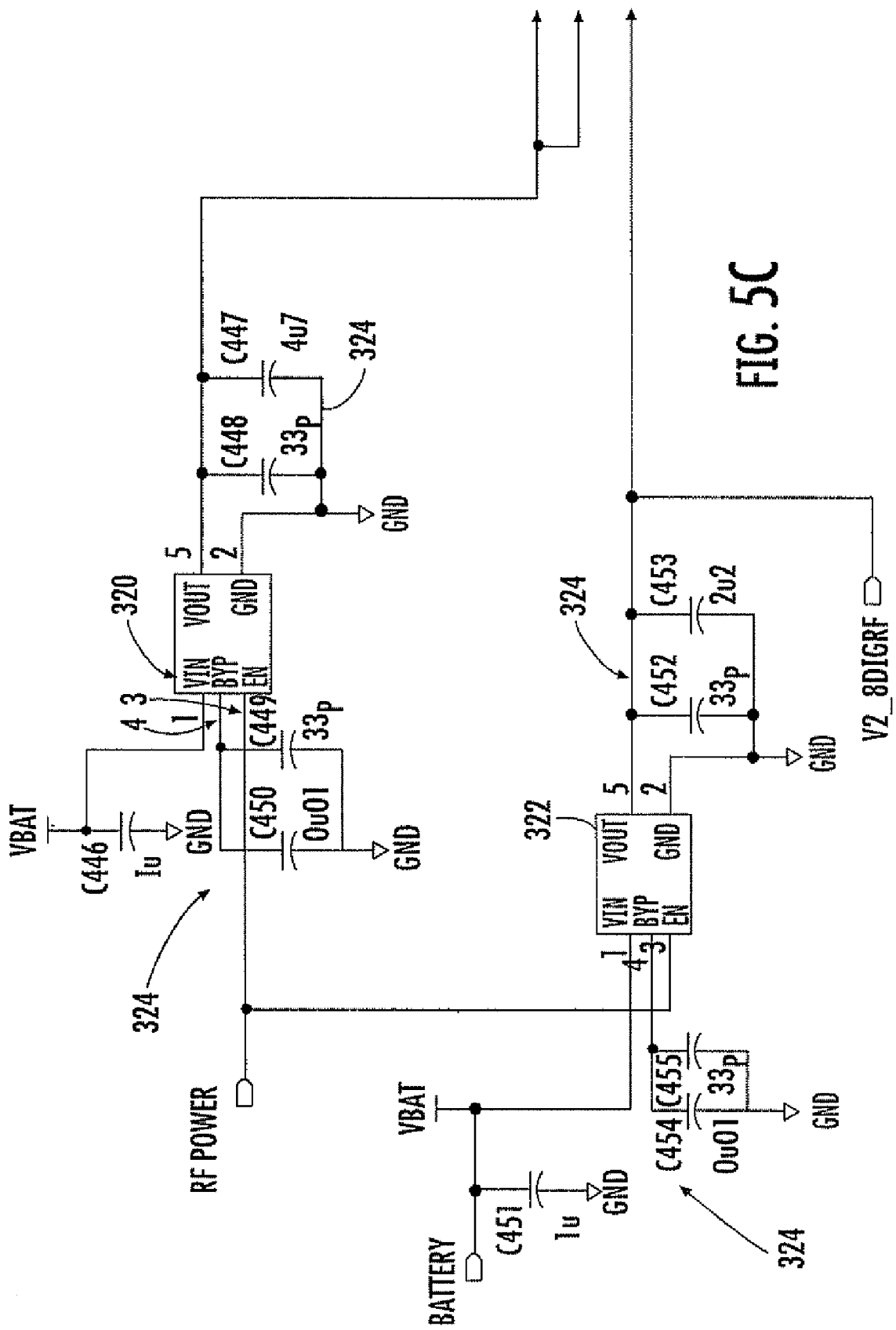

FIGS. 5A through 5C are interrelated schematic circuit diagrams showing portions of a radio transceiver 300 with various components, and an example of a clock buffering circuit as described for isolating different clock signals. A clock distribution network prevents and eliminates digital noise from the microprocessor 302 shown in FIG. 5B from transferring back to a Bluetooth circuit and further to other RF circuits.

As illustrated, the output of crystal unit or oscillator 304 extends to the RF clock input directly. Although the clock 304 can operate at different frequencies, in one non-limiting example, the clock is about 26.0 MHz. This clock signal passes to a first buffer input formed by a transistor 306 as an NPN transistor. This is designed as an emitter follower and its output passes directly to a Bluetooth clock input 308. The output of this first buffer 306 also passes to the input of a second buffer 308 as a transistor, for example, a PNP transistor. Its collector output signal passes to the microprocessor. This type of circuit arrangement provides good noise rejection back to sensitive RF circuits. As illustrated, other components besides the microprocessor shown in FIG. 5B include circuit components 320, 322 (FIG. 5C) for RF power and battery power circuits, and including appropriate capacitor circuit 324. The circuits shown in FIG. 5A also include components 330 with the clock and system terminals and various capacitor circuits 332 and resistor circuits 334 as illustrated.

It should be understood that the buffering circuits as described can be operative with many different types of Bluetooth chips. Typically, the Bluetooth chip is operative as a Bluetooth module and is operative as a wireless technology standard for connecting devices to replace cables. It typically operates in radio frequencies at a 2.5 GHz frequency band and can transmit short distances of about 10 meters or less. Usually it has a bandwidth of about one megabyte per second (1 MBPS) with individual packets of up to 2,745 bits. A class three Bluetooth device could have a signal strength up to about 100 milliwatts for a range of about 100 meters. Usually three basic components are included in a Bluetooth module, including a processor, a baseband link controller that manages core Bluetooth processes and a radio that implements the 2.5 GHz air interface. The Bluetooth architecture typically includes an application program interface (API) libraries that are software modules that connect to host application programs to a Bluetooth communication system. The logical link control and adaptation protocol manages high level aspects of each connection, including encryption. It can convert the format of data between application program interfaces and lower level Bluetooth protocols. The link manager can manage physical details for Bluetooth connections. The baseband is a digital engine of a Bluetooth system. The Bluetooth radio converts digital baseband data to an from the 2.4 GHz analog signal typically using Gaussian frequency shift keying (GFSK) modulation.

Figure 6:
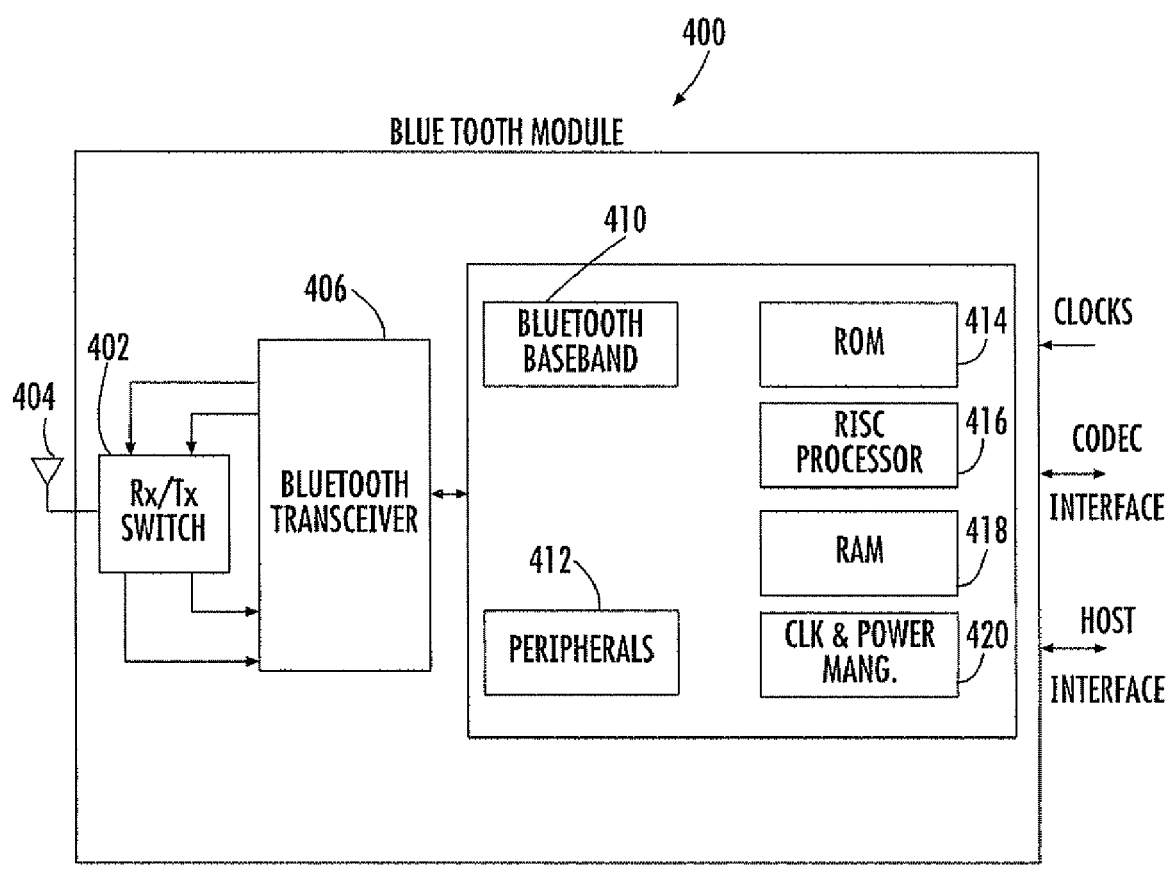
FIG. 6 is a block diagram of a typical Bluetooth module that can be used with the mobile wireless communications device shown in FIGS. 1-4 and 5A-5C.

FIG. 6 is a block diagram of a single-chip Bluetooth circuit shown at 400, for example, a BRF 6100/6150 chip that uses CMOS technology. As shown in FIG. 6, a receiver/transmitter switch 402 receives signals from an antenna 404. The RF signals are transferred into and out of a Bluetooth transceiver 406. The Bluetooth transceiver is operative with a module subgroup that includes a Bluetooth baseband circuit 410, peripherals 412, ROM 414, a RISC processor 416, RAM 418, and clock and power management circuits 420. The clock input, CODEC interface and host interface are illustrated. This type of module can work directly from a battery ranging from about 2.7 to about 5.4 volts in one non-limiting example and has improved radio frequency performance.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a housing;
a plurality of circuit boards carried by the housing, at least one of said circuit boards including an oscillator having an output and configured to generate a clock signal, a microprocessor, a radio frequency (RF) transceiver, RF circuitry and an analog or digital circuit and operative with each other wherein the RF transceiver is more sensitive to the digital noise from the microprocessor than the RF circuitry, which is more sensitive to the digital noise than the analog or digital circuit; and
clock buffer circuitry carried by at least one of the circuit boards and comprising serially connected first, second and third buffers wherein said RF transceiver and said first buffer are connected to said oscillator output, and said RF circuitry is connected to the output of the first buffer, the analog or digital circuit is connected to the output of the second buffer, and the microprocessor is connected to the output of the third buffer and said buffers configured to reduce the digital noise at the RF transceiver and followed in order by the RF circuitry and the analog or digital circuit.

2. A mobile wireless communications device according to claim 1, wherein said RE circuitry comprises a Bluetooth module.

3. A mobile wireless communications device according to claim 2, wherein said analog or digital circuit comprises a phased locked loop circuit.

4. A mobile wireless communications device according to claim 1, wherein said RF transceiver comprises a GSM/GPRS (Global System for Mobile communications/General Packet Radio Service).

5. A mobile wireless communications device according to claim 1, wherein each buffer provides about 40 to about 80 decibels of reverse isolation from its output to its input.

6. A mobile wireless communications device according to claim 1, wherein said plurality of serially connected buffers comprises transistors connected as emitter followers.

7. A mobile wireless communications device according to claim 1, wherein said housing is configured for handheld operation.

8. A mobile wireless communications device according to claim 1, wherein said RF transceiver, RF circuitry and microprocessor are operative as a cellular communications device.

9. A mobile wireless communications device according to claim 1, and further comprising an antenna carried by the housing and operative with the RF transceiver.

10. A method of forming a mobile wireless communications device, which comprises:
forming a housing and a plurality of circuit boards carried by the housing and at least one of the circuit boards including an oscillator having an output and configured to generate a clock signal, a microprocessor, a radio frequency (RF) transceiver, RF circuitry and an analog or digital circuit and operative with each other wherein the RF transceiver is more sensitive to the digital noise from the microprocessor than the RF circuitry, which is more sensitive to the digital noise than the analog or digital circuit;
reducing the digital noise at the RF transceiver, the RF circuitry and analog or digital circuit by forming clock buffer circuitry comprising serially connected first, second and third buffers;
connecting the RF transceiver and the first buffer to the oscillator output;
connecting the RF circuitry to the output of the first buffer;
connecting the analog or digital circuit to the output of the second buffer; and
connecting the microprocessor to the output of the third buffer wherein the buffers are configured for reducing the digital noise at the RF transceiver and followed in order by the RF circuitry and the analog or digital circuit.

11. A method according to claim 10, wherein each buffer provides about 40 to about 80 decibels of reverse isolation from its output to its input.

* * * * *